United States Patent [15] 3,639,871
Trbovich et al. [45] Feb. 1, 1972

[54] TORQUE MOTOR

[72] Inventors: Nicholas D. Trbovich, West Seneca; William H. Meyer, East Aurora; Paul R. Bauer, Akron, all of N.Y.

[73] Assignee: Servotronics, Inc., Buffalo, N.Y. by said Meyer and Bauer

[22] Filed: May 21, 1970

[21] Appl. No.: 39,446

[52] U.S. Cl. ............................. 335/274, 310/36, 335/230
[51] Int. Cl. ............................. H01f 7/08, H01f 7/13
[58] Field of Search ............................. 335/274, 230; 310/36

[56] References Cited

UNITED STATES PATENTS 3,535,563   10/1970   Mooney et al. ............................. 310/36
3,905,871   9/1959    Martin ............................. 310/36
3,517,359   6/1970    Trbovich et al. ............................. 335/230

FOREIGN PATENTS OR APPLICATIONS 899,469   5/1960   Great Britain ............................. 335/274

Primary Examiner—R. F. Staubly
Assistant Examiner—Hugh D. Jaeger
Attorney—Christel & Bean

[57] ABSTRACT

A torque motor having a housing and an armature mounted in the housing. The armature is supported for oscillatory movement on an upright, solid armature mounting member anchored at its lower end to the bottom shunt of the motor and carrying the armature at its upper end. The mechanical spring rate of the spring member can be adjusted by removing material from the web of the spring member, and this locates the armature pivot point.

10 Claims, 6 Drawing Figures

PATENTED FEB 1 1972
3,639,871
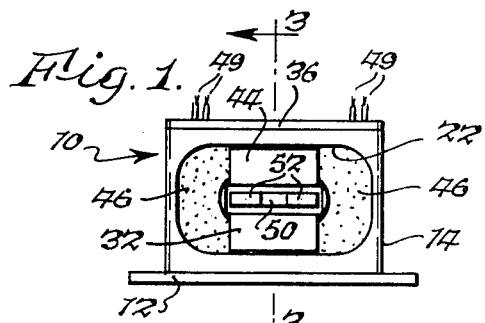
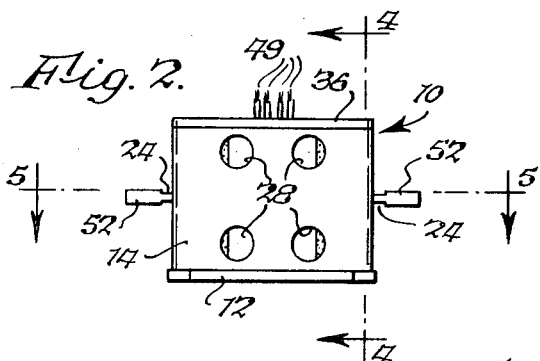
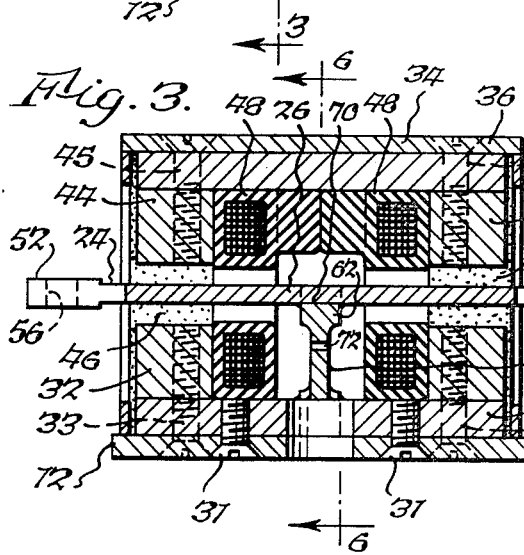
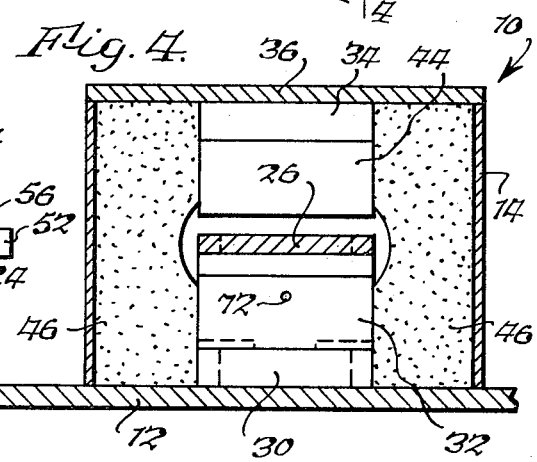
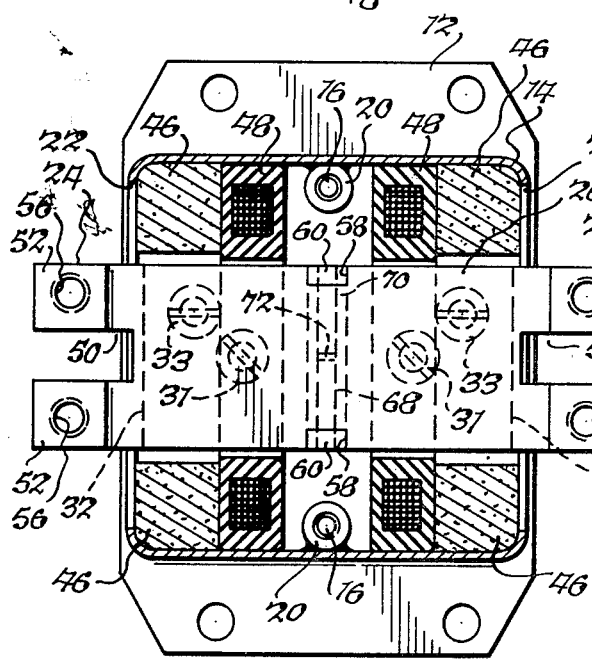
INVENTOR.
Nicolas D. Trbovich, William H. Meyer
& Paul R. Bauer
BY
Christel & Bean
ATTORNEYS.

TORQUE MOTOR

BACKGROUND OF THE INVENTION

This invention relates generally to torque motors and, more particularly to new and useful torque motor constructions having improved armature mounting means.

Electromechanical actuators of the torque motor type are used extensively in electrohydraulic, electropneumatic and hot gas servosystems. These torque motors have armatures which often are supported at opposite sides by laterally extending shafts connected to the housing and serving as torsion springs providing a mechanical spring rate. This mechanical spring rate is affected by the polarizing flux of permanent magnets mounted in the motor. The permanent magnets have the effect of a negative spring which subtracts from the stiffness of the mechanical spring, resulting in a combined "net spring rate." The "net spring rate" is very critical in permitting or resisting armature displacement in response to a force resulting from the input control current applied to the motor. It is difficult to maintain close tolerances on the torsion shafts, and undesirable stresses are set up if they are tuned by the localized removal of material. Also, such torsion bar mounting is inherently unstable under conditions of severe vibration.

SUMMARY OF THE INVENTION

An object of the present invention is to provide a torque motor having an improved solid armature support serving as a mechanical spring.

Generally speaking, the torque motor of the present invention is characterized by the provision of a solid armature mounting spring member anchored to the bottom shunt of the motor and acting as a cantilever beam with the armature mounted on the spring member's upper extremity. The mechanical spring rate of the spring member can be adjusted by drilling or otherwise removing material from the web of the member, thus altering the web configuration to vary the spring rate thereof.

The foregoing and other objects, advantages and characterizing features of the present invention will become clearly apparent from the ensuing detailed description of an illustrative embodiment thereof, taken together with the accompanying drawings wherein like reference characters denote like parts throughout the various views.

BRIEF DESCRIPTION OF THE DRAWINGS

FIG. 1 is a side elevational view of a torque motor of the present invention;

FIG. 2 is a front elevational view of the torque motor of FIG. 1;

FIG. 3 is an enlarged, vertical sectional view thereof taken about on line 3—3 of FIG. 1;

FIG. 4 is an enlarged, vertical sectional view thereof taken about on line 4—4 of FIG. 2;

FIG. 5 is enlarged, horizontal sectional view thereof taken about on line 5—5 of FIG. 2; and FIG. 6 is a vertical sectional view thereof taken about on line 6—6 of FIG. 3.

DETAILED DESCRIPTION OF AN ILLUSTRATIVE EMBODIMENT

Referring now in detail to the drawing, there is shown a torque motor, generally designated 10, of the present invention comprising a base mounting plate 12 having a housing 14 mounted thereon as by means of screws 16 extending through openings in plate 12 and threaded into sockets 20 carried by housing 14 (FIGS. 5 & 6). Housing 14 is provided with relatively large openings 22 on two opposite sides thereof for receiving the opposite end portions 24 of an armature 26. The other two sides of housing 14 are provided with a plurality of relatively small openings 28 for cooling purposes.

The magnetic circuit is of a generally known type, comprising for example a bottom shunt 30 of magnetic material mounted on plate 12 as by means of screws 31 and a pair of lower magnetic pole pieces 32 supported on the upper surface of shunt 30 at opposite ends thereof in spaced relation to the bottom surface of armature 26. Pole pieces 32 are secured to bottom magnetic shunt 30 by suitable fasteners, such as screws 33 extending upwardly through plate 12 and bottom shunt 30. An upper shunt 34 of magnetic material is secured to the underside of top cover plate 36, which in turn is secured to housing 14 by means of screws 38 passing through openings in cover 36 and threaded into sockets 42 carried by housing 14 (FIG. 6). A pair of upper magnetic pole pieces 44 are secured to the lower side of upper magnetic shunt 34 in spaced relation to the top surface of armature 26 by means of screws 45 extending through aligned openings in cover 36 and shunt 34.

Permanent magnets 46 are provided on opposite sides of lower and upper pole pieces 32 and 44, respectively. Two control coils 48 are positioned inwardly of pole pieces 32 and 44 around armature 26 as shown in FIGS. 3 and 5, for varying the relative flux acting on the opposite ends of armature 26. Magnets 46 can be secured to pole pieces 32 and 44 by a suitable potting compound, such as an epoxy resin. Also, coils 48 can be secured to shunts 30 and 34 by similar potting compound. Suitable electric leads 49 are connected to each coil 48 and extend upwardly and outwardly through cover plate 36 for attachment to a suitable source of electric power (not shown). Such magnetic circuits as described above and their operation are known, and it is believed that no further amplification or description thereof is necessary.

Armature 26 is of generally rectangular shape in plan and can be formed of a solid member of magnetic material or, if desired, of stacked, side-by-side lamina of magnetic material bonded together by a suitable insulating adhesive such as an epoxy resin. The opposite ends of armature 26 are slotted as at 50 to provide paired fingers 52 having enlargements on the free ends thereof. Power takeoff means in the form of tapped openings 56 adapted to receive power takeoff members are provided in the enlargements. The sides of armature 26 are slotted as at 58 (FIGS. 5 and 6) for receiving the upstanding fingers 60 of a solid armature mounting spring member 62.

A significant feature of this invention is the provision of a solid armature mounting spring member 62 which is provided with a pair of downwardly projecting ears 64 anchored in slots 66 provided at the sides of bottom shunt 30. Ears 64 can be bonded or otherwise fixedly secured in slots 66. Spring member 62 acts as a cantilever beam with a load at its extremity, the load being armature 26 which is pivotally supported by member 62 for movement of the opposite ends of armature 26 under the influence of control coils 48. Spring member 62 preferably is formed of beryllium copper, but it can be formed of any suitable nonmagnetic spring material.

The thickness of armature mounting spring member 62 is reduced in its medial or central web portion, as shown at 68, to facilitate the springing action of member 62, and a flat saddle portion 70 is provided at the upper end of spring member 62, between fingers 60 thereof, for supporting the central portion of armature 26.

The solid armature mount 62 offers several advantages. For one, it spaces armature 26 from top and bottom shunts 30, 34 and maintains the desired spacing therebetween under conditions of vibration and stress more effectively than conventional, laterally extending torsion bars. It is a more stable armature mounting than such torsion bars, lateral stability being provided by its width and orientation relative to the armature.

Also, the spring rate of armature mounting member 62, which acts as a mechanical spring, can be varied by altering the web configuration of member 62. This is done by drilling one or more holes 72 in web portion 68, or otherwise removing material therefrom. In this manner, the spring rate of member 62 can be easily and quickly varied to provide the desired net spring rate. While a circular hole is shown by way of illustration, slots and openings of other configurations can result from such removal of material.

The size of armature mount 62 is such that removal of material therefrom does not unduly stress the same, unlike the conventional, smaller and more delicate laterally extending torsion arms wherein such removal of material is quite apt to set up undesirable stress points.

In addition to varying the spring rate, removal of material from armature mount 62 locates the pivot point of the mounted armature, because the armature mount bends about its weakest point and this is the area where material has been removed, as at 72. Opening 72 therefore usually will be located closely adjacent armature 26, thereby raising the pivot point. While opening 72 does provide a zone of weakness, which is utilized in this manner, the physical size and nature of mount 62 is such that it can very capably withstand the resulting stress.

From the foregoing, it is apparent that the objects of the present invention have been fully accomplished. Only one armature mounting member is required, and it provides a very stable mount which can be tuned and the pivot point of which can be raised easily and simply by the localized removal of material, without undesirably stressing the member.

A selected embodiment of this invention having been disclosed in detail, it is to be understood that this has been done by way of illustration only.

We claim:

1. A torque motor comprising a generally solid mechanical spring member supported adjacent one end thereof, and an armature mounted on said member adjacent the opposite end thereof for oscillation about an axis, said member extending generally normal to the plane of said armature and flexing in the manner of a cantilever beam in a plane normal to said axis to accommodate such armature oscillation.

2. A torque motor as set forth in claim 1, wherein said member has a width several times the thickness thereof and is elongated transversely of said armature.

3. A torque motor as set forth in claim 1, wherein said member has an intermediate web portion of reduced thickness in the lengthwise direction of said armature.

4. A torque motor as set forth in claim 1, wherein said member has a spring rate defining opening therethrough.

5. A torque motor as set forth in claim 4, wherein said opening is adjacent said armature and also locates said axis.

6. A torque motor as set forth in claim 1, wherein said armature is mounted between its ends and extends in opposite directions beyond said member.

7. A torque motor as set forth in claim 6, said armature having power takeoff means adjacent the opposite ends thereof.

8. A torque motor as set forth in claim 1, together with a housing, said member being supported adjacent the bottom of said housing.

9. A torque motor as set forth in claim 1, together with magnetic control means associated with said armature.

10. A torque motor as set forth in claim 9, wherein said magnetic control means include upper and lower magnetic shunts, pole pieces associated with said shunts in spaced relation to said armature on opposite sides thereof, permanent magnets associated with said pole pieces, and electromagnetic control coils associated with said armature for selectively varying the magnetic flux acting thereon, said one end of said spring member being connected to one of said shunts.

* * * * *